United States Patent [19]

Ohnishi et al.

[11] Patent Number: 4,502,120
[45] Date of Patent: Feb. 26, 1985

[54] SYSTEM FOR DATA TRANSMISSION BETWEEN ELECTRONIC CASH REGISTERS

[75] Inventors: Souichi Ohnishi, Yao; Fusahiro Shiono, Habikino, both of Japan

[73] Assignee: Sharp Kabushiki Kaisha, Osaka, Japan

[21] Appl. No.: 381,221

[22] Filed: May 24, 1982

[30] Foreign Application Priority Data

May 29, 1981 [JP] Japan .................................. 56-82740

[51] Int. Cl.³ .............................................. G06F 15/20
[52] U.S. Cl. ..................................... 364/405; 364/900
[58] Field of Search .............. 364/405, 404, 900, 200

[56] References Cited

U.S. PATENT DOCUMENTS

| | | | |
|---|---|---|---|
| 4,091,448 | 5/1978 | Clausing | 235/379 |
| 4,319,326 | 3/1982 | Uchida | 364/405 |
| 4,360,872 | 11/1982 | Suzuki et al. | 364/900 |
| 4,388,689 | 6/1983 | Hayman et al. | 364/404 |
| 4,398,250 | 8/1983 | Hosono | 364/404 |

FOREIGN PATENT DOCUMENTS

| | | | |
|---|---|---|---|
| 54-50251 | 4/1979 | Japan | 364/405 |
| 54-44455 | 4/1979 | Japan | 364/405 |

*Primary Examiner*—David H. Malzahn
*Attorney, Agent, or Firm*—Birch, Stewart, Kolasch & Birch

[57] ABSTRACT

A subsystem comprises an input device for inputting data, an operation device for operating the data, a memory device for memorizing the data, and a transmitting device for dividing the data into parts and transmitting every of the parts of the data into a master system. The master system comprises a receiving device for receiving the parts of the data. The capacity of the receiving device for receiving one of the parts of the data is identical with the capacity of the memory device for memorizing said one of the parts of the data. Preferably, a plurality of subsystems are connected to the sole master system. At least one of the master system and the subsystems is an electronic cash register.

9 Claims, 5 Drawing Figures

SYSTEM FOR DATA TRANSMISSION BETWEEN ELECTRONIC CASH REGISTERS

BACKGROUND OF THE INVENTION

The present invention relates to an electronic cash register and, more particularly, to an electronic cash register (ECR) suitable for use in a data transmission system.

The conventional data transmission system includes a master unit and a plurality of subsystems. Each of the subsystems performs the full functions of an electronic apparatus such as an electronic cash register (ECR). The master system and the subsystems are disposed in a single building. The master system such as an ECR is provided for summing a plurality of items of information transmitted from the subsystems. For this purpose, conventionally, capacity of the memory in the master system must be large enough to cover the total capacity of the memories in the subsystems to facilitate data transmission.

However, in view of cost requirements it is disadvantageous for the memory of the master system to be of a large capacity. Therefore, it is desirable to remove such a requirement.

SUMMARY OF THE INVENTION

Accordingly, it is an object of the present invention to provide an improved electronic cash register (ECR) suitable for use in a data transmission system.

It is a further object of the present invention to provide an improved ECR as a master machine comprising a memory by which data can be received in excess of the capacity of the memory, the data being transmitted from subsystem ECRs.

It is a further object of the present invention to provide an improved ECR functioning as a subsystem or a slave machine suitable for data transmission, the ECR comprising a memory for storing data, such that the data is divided into multiple parts for transmission.

Briefly described, in accordance with the present invention, a subsystem comprises an input device for inputting data, an operation device for operating the data, a memory device for memorizing the data, and a transmitting device for dividing the data into parts and transmitting each of the parts of the data to a master system. The master system comprises a receiving device for receiving the parts of the data. The capacity of the receiving device for receiving one of the parts of the data is identical to the capacity of the memory device for memorizing said one of the parts of the data.

Preferably, a plurality of subsystems are connected to the sole master system. At least, one of the master system and the subsystems is an electronic cash register.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
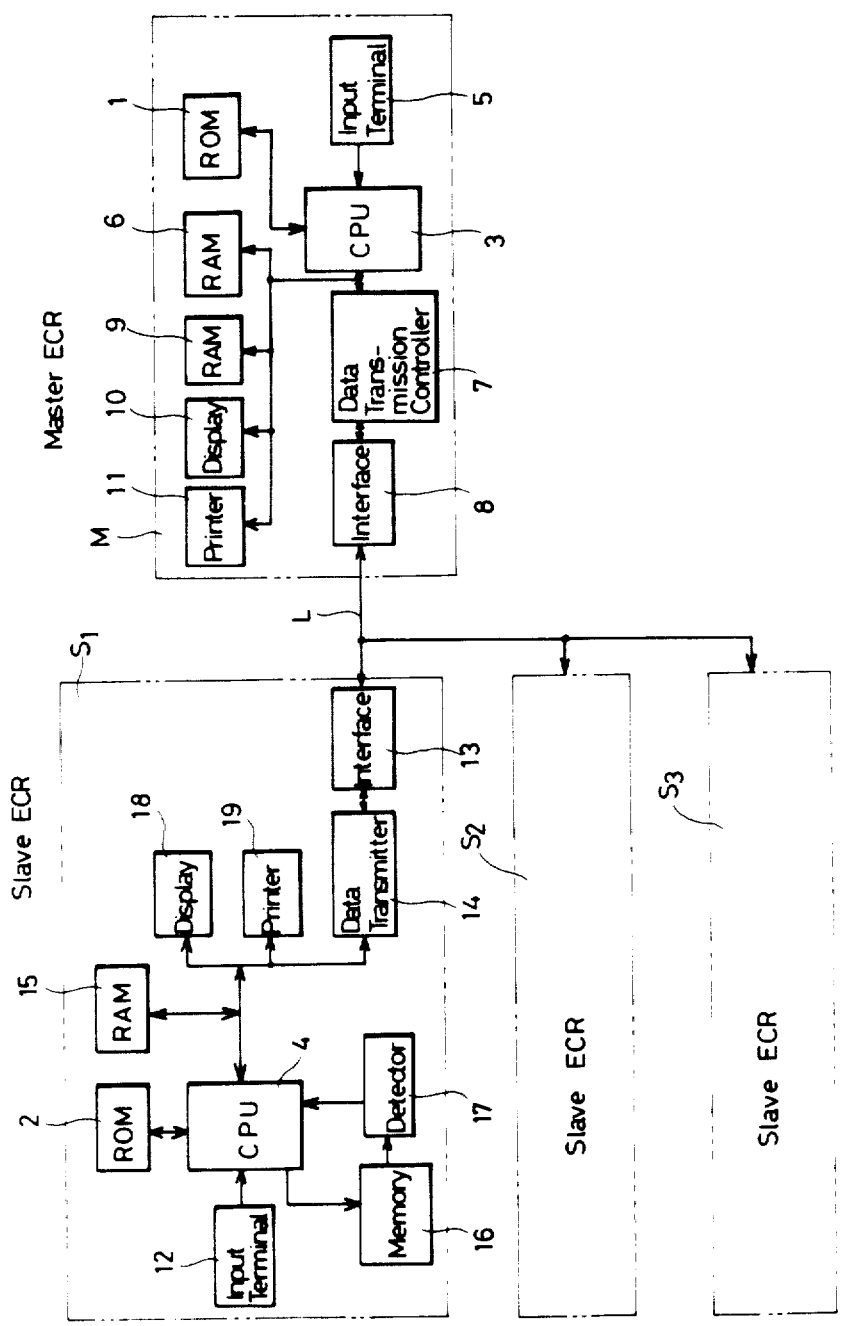
FIG. 1 shows a block diagram of a master ECR and in-line subsystem or slave ECRs according to the present invention.

FIG. 1 shows a block diagram of a master electronic cash register (ECR) and slave (subsystem) ECRs according to the present invention. Data can be transmitted between the master ECR and the slave ECRs. Each of these ECRs independently can register money information. The master ECR and the slave ECRs form a register in-line system.

In FIG. 1, a communication line L is connected between the master ECR M and the slave ECRs S to form the system. (In FIG. 1, three slave ECRs $S_1$ to $S_3$ are connected.)

The three slave ECRs are identical except for their memory capacity. Therefore, the slave ECR $S_1$ is exemplarily described in detail. The master ECR M and the slave ECR $S_1$ comprises ROMs 1 and 2, respectively, for storing programs according to which the ECRs M and $S_1$ are operated. CPUs 3 and 4 are provided for controlling the operation of the ECRs M and $S_1$.

The master ECR M comprises an input terminal 5 for inputting various items of register data. The terminal 5 is operated to input a machine number into the CPU 3. The slave ECR corresponding to the machine number is selected to output sales data into the master ECR for totaling. The CPU 3 of the master ECR M is provided for operating the input data and transferring its results into a RAM 6 for storage. The CPU 3 is provided for delivering data transmission commands into the slave ECR corresponding to the machine number inputted, through a transmission controller 7, an interface 8 and the communication line L.

The RAM 6 of the master ECR M stores the sales data after operated under the control by the CPU 3. A RAM 9 for data receiving (data totaling operation) has a capacity of 1K byte or so to total and store the sales data transferred from the slave ECRs. A display 10 of the master ECR M is provided for displaying the contents of the RAMs 6 and 9. A printer 11 is provided for printing out the contents onto a sales slip journal.

The CPU 4 of the slave ECR $S_1$ is operated to enable the sales data to be registered. The sales data is inputted by an input terminal 12 of the slave ECR $S_1$. The CPU 4 receives the data transmission commands from the master ECR M, through an interface 13 and a data transmitter 14 of the ECR $S_1$. When the commands are intended to select the ECR $S_1$, information for describing the memory capacity of this ECR and the sales data in a RAM 15 are transmitted. The data of the RAM 15 are divided for transmittance.

The RAM 15 of the slave ECR $S_1$ has a capacity of 3K byte and stores the sales data after being operated under control by the CPU 4. A memory 16 is provided for storing information representative of the memory capacity of the RAM 15, for example, 3. The contents of the memory 16 are decremented by the control of the CPU 4 each time the divided data is transferred into the master ECR M. A detector 17 is provided for detecting the contents of the memory 16 to input a machine-lock signal or a machine-lock releasing signal into the CPU 4. A display 18 of the slave ECR $S_1$ is provided for displaying the contents of the RAM 15. A printer 19 is provided for printing out the contents onto the sales slip or journal.

Figure 2:
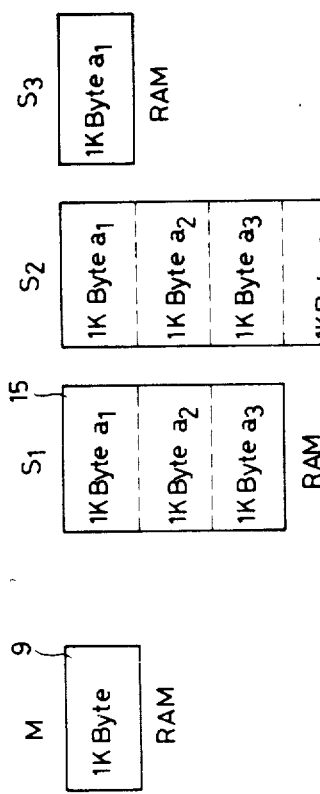
FIG. 2 shows a constructional relationship between a memory in the master ECR and memories in the slave ECRs as shown in FIG. 1.

FIG. 2 shows a constructional relation between the RAM 9 for data receiving (data totaling operation) in the master ECR M and the RAMs 15 control in each of the slave ECRs $S_1$ to $S_3$. The RAM 9 has a memory capacity of 1K byte. The RAM 15 of the ECR $S_1$ has a memory capacity of 3K byte. The RAM 15 of the ECR $S_2$ has a 4K byte capacity. The RAM 15 of the ECR $S_3$ has a 1K byte capacity. Each of the data areas $a_1$, $a_2$, $a_3$ and $a_4$ has a capacity of 1K byte.

Figure 4:
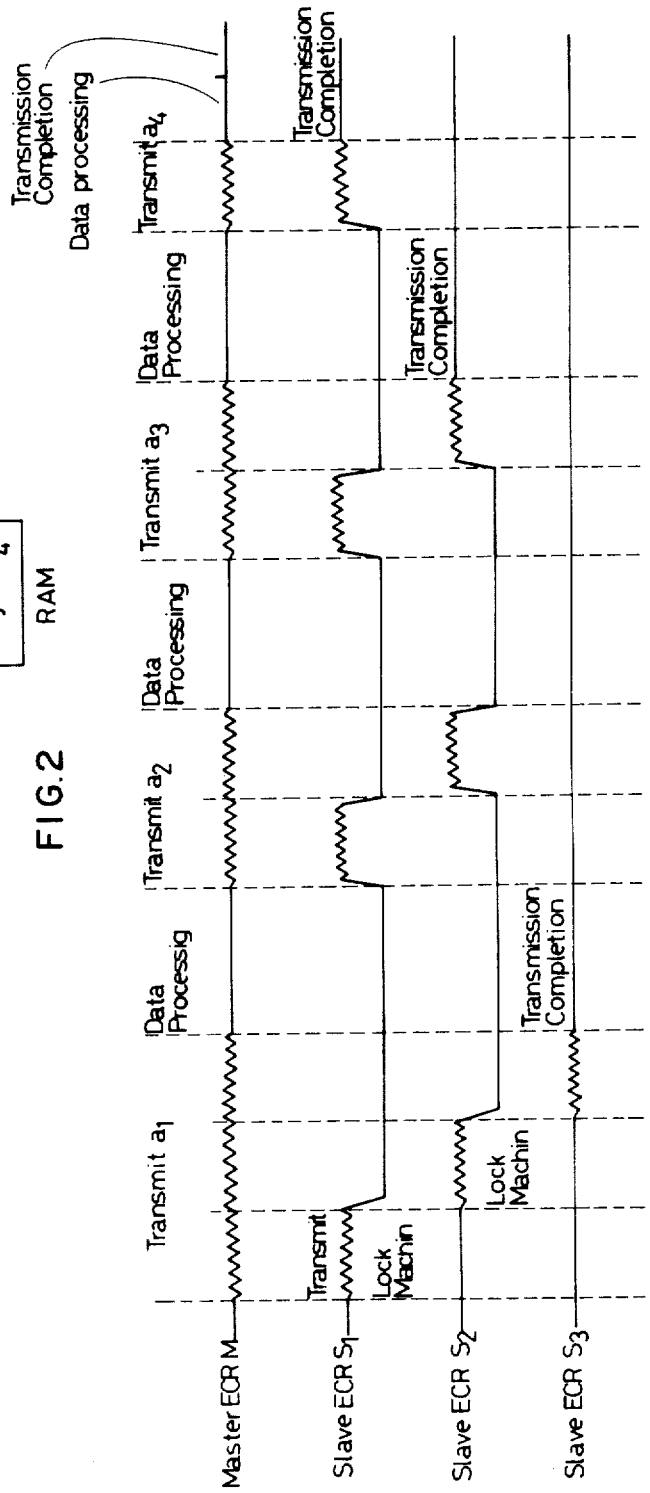
FIG. 4 shows a correlated operation between the master ECR and the slave ECRs.
Figure 3:
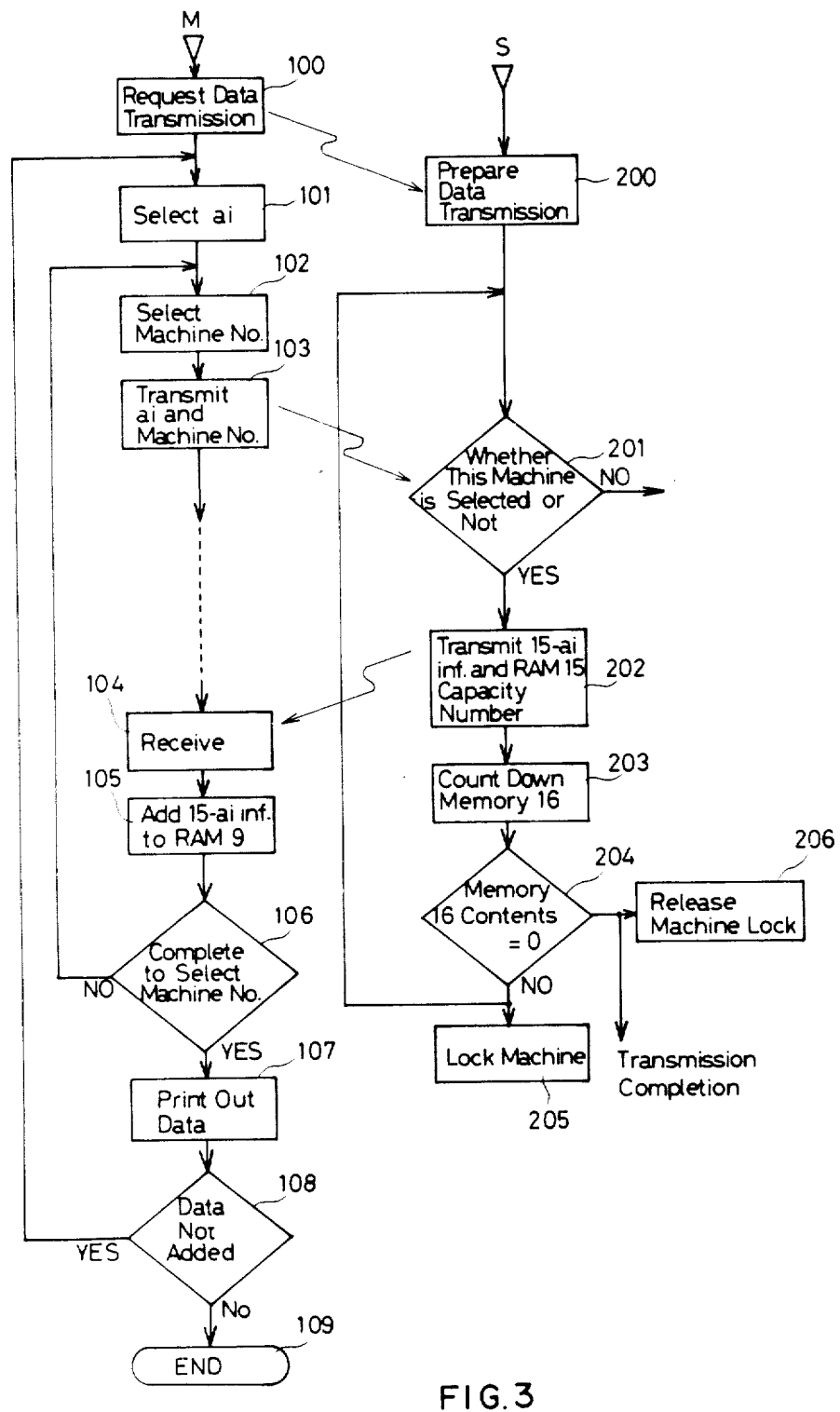
FIG. 3 shows a flowchart of the operation of the master ECR and the slave ECRs.

FIG. 3 shows a flowchart of the operation of the master ECR and the slave ECRs in a preferred form of the present invention. FIG. 4 shows the correlation operation between these ECRs. In FIG. 3, a program routine for the master ECR M and program routines for the slave ECRs are combined.

The operator inputs the machine number for specifying one of the slave ECRs from which the sales data is collected. The machine number is inputted by the input terminal 5 of the master ECR M. The machine number is one of digits 1 to 3 corresponding to the slave ECRs $S_1$ and $S_3$. Then, the operator actuates a key commanding the machine to transmit the data. The inputs of the RAM 9 of the master M is made zero. The CPU 3 delivers the data transmission commands into the slave ECRs $S_1$ and $S_3$ (step 100).

The data transmission commands (break signals) are introduced into the slave ECRs $S_1$ and $S_3$ through the communication line L. Responsive to the data transmission commands, the CPU 4 of each of the slave ECRs $S_1$ to $S_3$ places each of the ECRs $S_1$ and $S_3$ in a condition of preparation to transmit the data (step 200).

The master ECR M is operated to select a data area $a_i$ from which the data is delivered for totaling. At first, the data area $a_1$ is selected (step 101). The machine number is selected (at first No. 1) (step 102). The information of the data area and the machine number is inputted into the respective slave ECRs (step 103). The respective CPUs 4 of the slave machines are operated to detect what machine the information is directed to (step 201, the machine which corresponds to the machine number transmitted is determined.)

When the machine number is detected one machine, the machine is operated such that the number memory capacity in the detected machine and the sales data stored in the data area $a_1$ of the RAM 15 are read out and transmitted into the master ECR M. When the slave ECR $S_1$ is selected, the number of the memory capacity is 3 (step 202).

After the slave machine enables the data to be transmitted, the machine is operated such that the contents of the memory 16, representative of the memory capacity number, are subtracted by 1. The memory 16 of the slave ECR $S_1$ therefore stores memory capacity information of 2. The detector 17 detects whether the results are equal to zero. When not, the machine lock signal is applied to the CPU 4. When zero, the data transmission operation is terminated, so that the machine lock condition, when set, is released. (steps 203, 204, 205 and 206).

Responsive to receipt of the data from the slave ECR, the master ECR M stores the memory capacity number of the slave machine, and the RAM 9 of the master machine adds and stores the data from the area $a_1$ of the RAM 15. (steps 104 and 105). The master machine M detects whether selection of the slave machine or machines is terminated (step 106). When the selection is not terminated, a further machine number (No. 2) is selected (step 102). The information of the data area $a_i$ and the machine number is transmitted to the slave machines (step 103).

When selection of the machine numbers is terminated (all the data areas $a_i$ of the slave ECRs $S_1$ to $S_3$ are selected for totaling), the contents of the RAM 9 are printed out by the printer 11 (step 107). It is then detected whether the data area $a_i$, from which the data are to be totaled, has been added (step 108). When it is detected that the data area $a_i$ (for example, $a_2$) has not been selected, this data area $a_i$ is selected (step 101). Operations similar to those conducted, thereafter.

When all data area have been totaled, the data transmission is completed. The memory capacity information transmitted from the slave ECRs $S_1$ to $S_3$ is referred to when the slave machines are selected to total the data from the data areas following the data area $a_1$. For example, when the data are collected from the data area $a_2$, the memory capacity number 1 of the slave ECR $S_3$ indicates that the data area $a_2$ is absent. Hence, only the slave ECRs $S_1$ and $S_2$ are selected. When the data are collected from the data area $a_4$, the memory capacity number of the respective slave machines indicates that only the slave machine $S_2$ owns the data area $a_4$. Only the machine number of the slave machine $S_2$ is selected.

As described above, when the data is transmitted and totaled from the data areas $a_1$ to $a_4$ of the slave ECRs $S_1$, $S_2$ and $S_3$, all the data from the slave machines is divided into 1K byte information portions corresponding to the 1K byte capacity of the memory of the master ECR M.

The operations of the ECRs in the order of the steps are as follows (see FIG. 4):

(1) The content of the memory of the master ECR for totaling the data is made zero.
(2) The data in the memory area $a_1$ of the slave ECR $S_1$ is transmitted and totaled by the totaling memory of the master ECR M.
(3) The data in the memory area $a_1$ of the slave ECR $S_2$ is transmitted and totaled by the totaling memory of the master ECR M.
(4) The data in the memory area $a_1$ of the slave ECR $S_3$ is transmitted and totaled by the totaling memory of the master ECR M.

If all of the memory areas $a_1$ of the slave ECRs $S_1$ to $S_3$ are fully occupied by 1k byte data, it may be difficult for all of the data stored in the memory areas $a_1$ to be received solely by the totaling memory of the RAM 9 of the master ECR M. Preferably, all of the memory areas $a_1$ of the slave machines are not full. Conventionally, since each of the memory areas of the slave machines is fixedly allotted to a specific classification concerning merchandize, it may be normal that each of the memory areas is not occupied fully by the data.

(5) When the data from the memory areas $a_1$ of all the slave ECRs are totaled, the master ECR M is prevented from receiving additional data. The data from the memory areas $a_1$ are printed out, so that the totaling memory is made clear to zero.
(6) When the data from the memory areas $a_1$ are summed, the master ECR M reopens to receive the data from the memory areas $a_2$ for totaling in the same manner.
(7) The same operations are repeated until the data from the memory areas $a_4$ are summed.
(8) Before each of the slave ECRs has transmitted all the data contained therein, it is locked at the time except the time when the data transmission from this slave machine is conducted. The machine lock condition assures that the data to be transmitted from the slave ECR is unchanged even when the slave ECR is operated for entering new data thereto, until the full data have been transmitted from the slave ECR to the master ECR.

Figure 5:
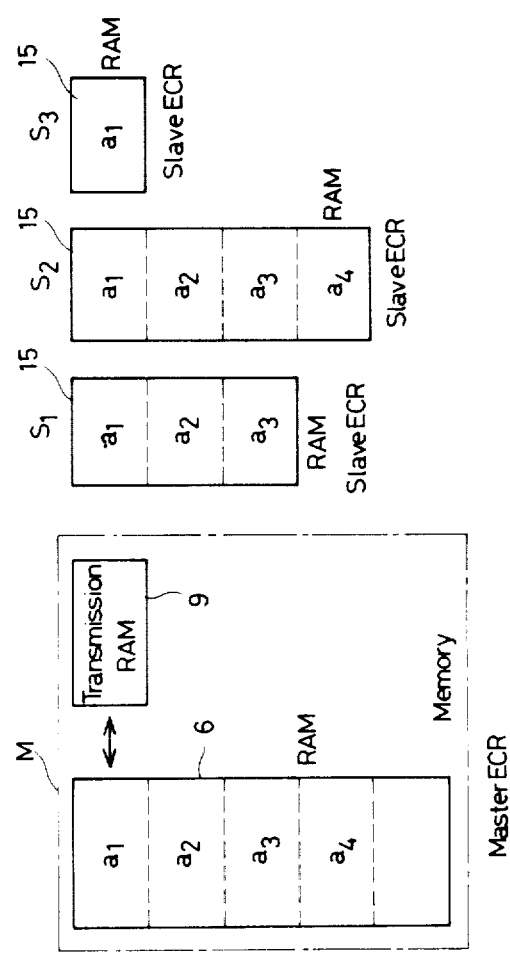
FIG. 5 shows another constructional relationship between the memory in the master ECR and the memories in the slave ECRs.

FIG. 5 shows another constructional relationship between the RAM 6 and the RAM 15 for transmission between the master ECR M and the RAMs 15 of the slave ECRs $S_1$ to $S_3$ according to another preferred form of the present invention. In FIG. 5, the architecture of the RAM 6 of the master ECR M is identical to that of the RAMs 15 of the slave ECRs $S_1$ to $S_3$. It is normal in a master-slave system that the memory architecture of the master machine and that of the slave machine are identical.

The RAM 9 for transmission is used to save the data from the RAM 6 of the master ECR M. The data from the RAMs 15 of the slave ECRs $S_1$ and $S_3$ are directly introduced for summing into the corresponding memory areas of the RAM 6 of the master ECR M.

The data in the memory area $a_1$ of the RAM 6 in the master ECR M are saved into the transmission RAM 9 (the saving memory).

The data from the memory areas $a_1$ of the slave ECRs $S_1$ to $S_3$ are sent into the memory area $a_1$ of the master ECR M and summed.

After the data in the memory area $a_1$ of the master ECR M is printed out, the data saved in the RAM 9 is returned into the memory area $a_1$ of the master ECR M. Further, the data stored in the memory area $a_2$ of the master ECR M is sent and saved in the RAM 9. The data is forwarded from the memory areas $a_2$ of the slave ECRs $S_1$ to $S_3$ to the memory area $a_2$ of the master ECR M for summing. This operation is repeated. Thus, the data transmission is conducted by dividing the data.

The invention being thus described, it will be obvious that the same may be varied in many ways. Such variations are not to be regarded as a departure from the spirit and scope of the invention.

What is claimed is:

1. A cash register system comprising:
   at least one remote cash register means for accumulating transaction data;
   master cash register means operatively interconnected to said remote cash register means for accumulating all said transaction data accumulated by each said remote cash register means;
   each said remote cash register means including,
      input means for introducing data into said remote cash register means,
      remote register memory means responsive to said introduced data for storing said data, and
      means for transmitting said data stored in said remote register memory means to said master cash register means; said master cash register means including,
   means for receiving data transmitted by said remote cash register means, and
      accumulator means for accumulating the data from each said remote cash register means, said accumulator means having master register memory means for storing said accumulated data, said master register memory means having a predetermined memory capacity;
   at least one memory means associated with at least one of said remote register means having a remote memory capacity greater than said predetermined memory capacity of said master register memory means;
   means for informing said master cash register means of the remote memory capacity of the remote register memory means of each said remote cash register means;
   said transmitting means repeatedly transmitting only portions of said data sized to correspond to said predetermined memory capacity, each said portion being being received by said means for receiving of said master cash register, said repeated transmission being terminated only after all data within said remote register memory means has been transmitted.

2. The system of claim 1 wherein each said remote cash register means includes memory capacity storage means for initially storing the memory capacity of said remote register memory means;
   said transmitting means transmitting said memory capacity stored in said memory capacity storage means to said master cash register means with each transmission of a portion of data;
   said master cash register storing said memory capacity of each said remote cash register means in a remote cash register memory capacity storage unit.

3. The system of claim 2 wherein said master cash register means transmits a data transmit command for each data portion, said portions being transmitted from each said remote cash register means in sequence.

4. The system of claim 2 wherein said master cash register means further comprises means for decrementing the contents of said remote cash register memory capacity storage unit for each remote cash register means upon transmission of each portion of said data from said remote register memory means to said master register means.

5. The system of claim 4 wherein said accumulator means of said master cash register means accumulates portions of data from each said remote cash register means until said memory capacity transmitted from all said remote cash register means is decremented to zero.

6. The system of claim 1 wherein said remote register means of said remote cash register means have different remote memory capacities.

7. The system of claim 5 wherein said remote register means of said remote cash register means have different remote memory capacities.

8. The system of claim 1 wherein said master cash register means further comprises means for transmitting a data transmit command to each said remote cash register to indicate that said data should be transmitted therefrom;
   each said remote cash register means comprising means for receiving said data transmit command and for enabling said means for transmitting of said remote cash register means.

9. A method of transmitting data from a plurality of remote cash registers having differing data storage capacities to a master cash register having a receiving memory with a master memory capacity less than the remote memory capacity of at least some of said remote cash registers comprising:
   (a) enabling transmission to said master cash register of data from all said remote cash registers;
   (b) selecting a first remote cash register to transmit data;
   (c) said first remote cash register transmitting its remote memory capacity and a portion of data stored in the memory of said remote cash register to said master cash register, said portion corresponding in size to said master memory capacity;

(d) storing said remote memory capacity of said first remote cash register;

(e) decrementing said remote memory capacity to determine remaining data to be transmitted by said first remote cash register;

(f) repeating steps b–e for each said remote cash register;

(g) determining if remaining data for transmission exists in said first cash register by examining said decremented remote memory capacity;

(h) transmitting a subsequent memory portion of said first remote cash register corresponding in size to said master memory capacity if remaining data for transmission is determined to exist;

(i) repeating steps g and h for each said remote cash register;

(j) repeating steps g–i until all data is transmitted.

* * * * *